United States Patent [19]

Barrett et al.

[11] Patent Number: 5,301,036
[45] Date of Patent: Apr. 5, 1994

[54] IMAGE ORIENTATION CONTROL

[75] Inventors: Michael W. Barrett, Rochester; Cynthia A. Smith, Pittsford; Carol P. Parsons Thomas, Webster; Pamela J. Barrett, Rochester; Timothy J. Kelley, Farmington, all of N.Y.

[73] Assignee: Xerox Corporation, Stamford, Conn.

[21] Appl. No.: 862,916

[22] Filed: Apr. 6, 1992

[51] Int. Cl.$^5$ .............................................. H04N 1/40
[52] U.S. Cl. ................................. 358/448; 358/444; 358/443; 358/468; 358/401; 382/46; 395/137; 395/159
[58] Field of Search ............... 358/448, 444, 401, 450, 358/451, 453; 382/46; 395/159, 137

[56] References Cited

U.S. PATENT DOCUMENTS

| | | | |
|---|---|---|---|
| 4,754,269 | 6/1988 | Kishi et al. | 395/137 |
| 4,929,085 | 5/1990 | Kajihara | 395/137 |
| 4,947,344 | 8/1990 | Hayashi et al. | 395/137 |
| 5,001,574 | 3/1991 | Shimizu et al. | 358/450 |
| 5,021,976 | 6/1991 | Wexelblat et al. | 395/159 |
| 5,038,218 | 8/1991 | Matsumoto | 358/448 |
| 5,050,225 | 9/1991 | Itoh | 358/448 |
| 5,075,785 | 12/1991 | Sugishima | 358/448 |
| 5,083,215 | 1/1992 | Hashimoto et al. | 358/448 |
| 5,204,916 | 4/1993 | Hamilton, Jr. et al. | 382/46 |

FOREIGN PATENT DOCUMENTS

| | | | |
|---|---|---|---|
| 0222382 | 12/1983 | Japan | 358/448 |
| 0023670 | 2/1984 | Japan | 358/448 |

Primary Examiner—Mark R. Powell
Assistant Examiner—Fan Lee
Attorney, Agent, or Firm—Mark Costello

[57] ABSTRACT

An electronic printing system having an image input for receiving digitally represented images from a source of input information such as an image input scanner; a controller having the capability of rotating an image in at least 90° increments and which can provide such rotation in accordance with a pre-programmed set of commands; a user interface, connected to the controller, and for directing information about the orientation of the input image, and information about output orientation and placement in accordance with one of a plurality of selectable output orientation; and an output, such as a binary printer, to which the controller may direct reoriented image data.

9 Claims, 14 Drawing Sheets

| EXAMPLE SIZE | FORMAT I | PAPER TRAVELS THROUGH PAPER PATH II | IMAGES ARE PLACED ON THE OUTPUT III | OUTPUT STOCK IS ORIENTED TO READ IV | ROTATION REQUIRED FOR RIGHT SIDE UP ORIENTATION V |
|---|---|---|---|---|---|
| 17 x 11 | BOOK | ▭ N↑ 400(a) | A\|B | A\|B | A\|B  0° |
| 17 x 11 | CALENDAR | ▭ N↑ 400(b) | A\|B | A\|B | A\|B  270° |
| 8.5 x 11 | BOOK | ▯ N↑ 400(c) | A/B | ∀\|ᗺ | A/B  90° |
| 8.5 x 11 | CALENDAR | ▯ N↑ 400(d) | A/B | A/B | A/B  0° |

FIG. 11

IMAGE ORIENTATION CONTROL

BACKGROUND OF THE INVENTION

The invention relates to electronic printers and printing systems, and more particularly, to accomplishment of certain jobs in such devices which provide automatic rotation of images.

In certain high speed electronic print publishing systems, such as for example, the Xerox Docutech Publishing System, first announced and made available to the public in October, 1990, rotation and placement of images and of multiple images on a single sheet or side of a sheet is desirable for several reasons. Such a capability makes possible operating features that enhance the production of document sets, including signatures, calendars, and certain duplex sets, that may be later bound.

The Xerox DocuTech provides a feature that allows specification of input orientation of an image and separately allows specification of output plex, independently of input orientation. Additionally, DocuTech allows printing signatures, which are always duplexed sheets, and requires specification of input orientation and plex and a limited selection of output orientation. Users, however, have difficulties in relating the selection of plex of a document with its image orientation. Accordingly, it is desirable to have full control of specifying input orientation and plex, as well as output orientation and plex, and provide operator understandable indicia of the same.

SUMMARY OF THE INVENTION

The present invention is directed to a rotation/page placement method, which the operator selects by providing information about orientation of an input image and desired output orientation and placement, from a group of given options. In accordance with a preprogrammed routine, given the known input and desired output orientations, rotation of the image as required is made.

In accordance with one aspect of the invention, there is provided a digital copier, having an image input for receiving digitally represented images from a source of input information such as an image input scanner; a controller having the capability of rotating an image in at least 90° increments and which can provide such rotation in accordance with a preprogrammed set of commands; a user interface, connected to the controller, and for directing information about the orientation of the input image, and information about output orientation and placement in accordance with one of a plurality of selectable output orientation; and an output, such as a binary printer, to which the controller may direct reoriented image data.

In accordance with another aspect of the invention, when printing signatures, orientation can be accomplished based on known information about the input orientation, signature format, and output print sheet size and orientation.

These and other aspects of the invention will become apparent from the following descriptions to illustrate a preferred embodiment of the invention read in conjunction with the accompanying drawings in which.

Figure 1:
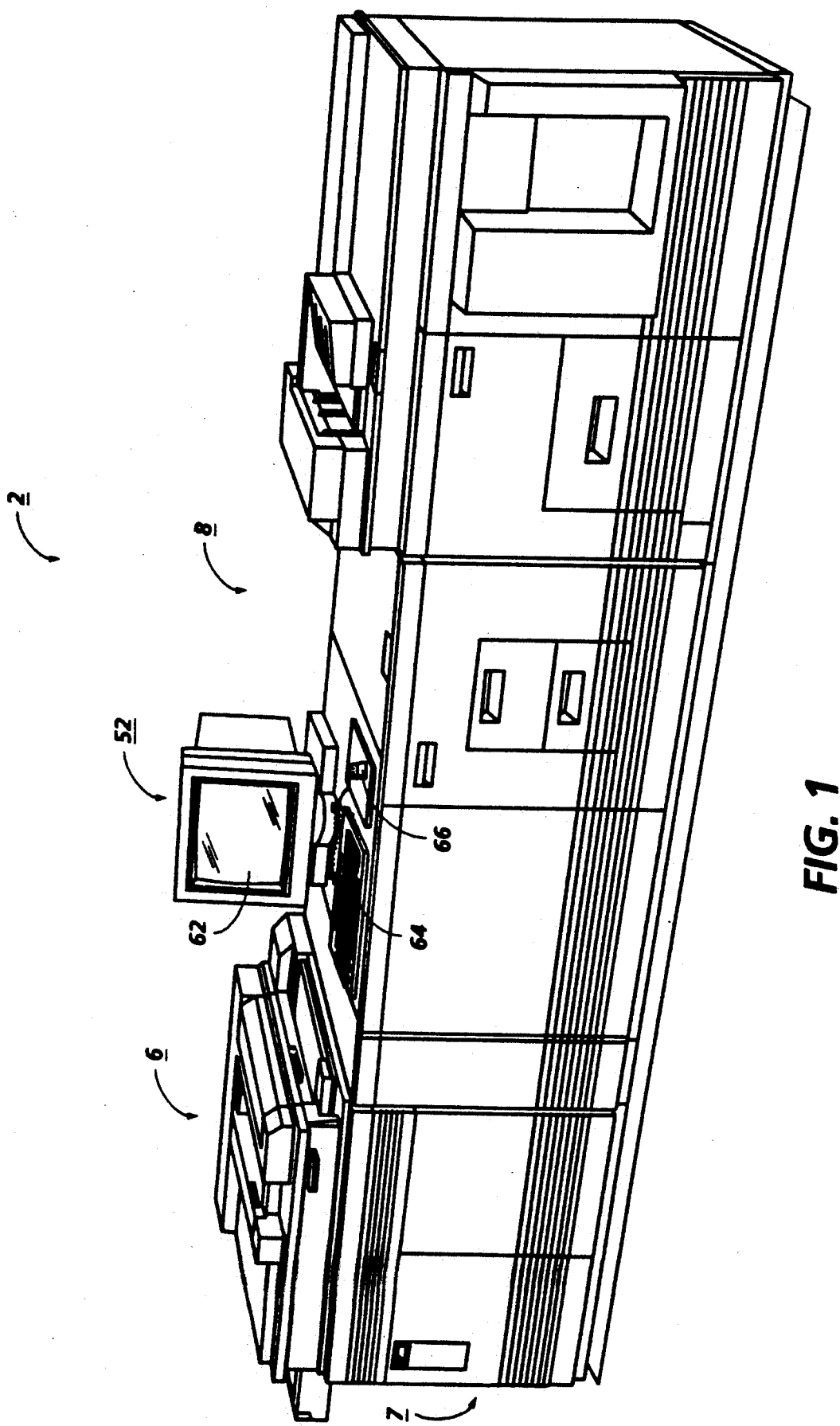
FIG. 1 is a view depicting an electronic printing system incorporating the present invention.
Figure 5A:
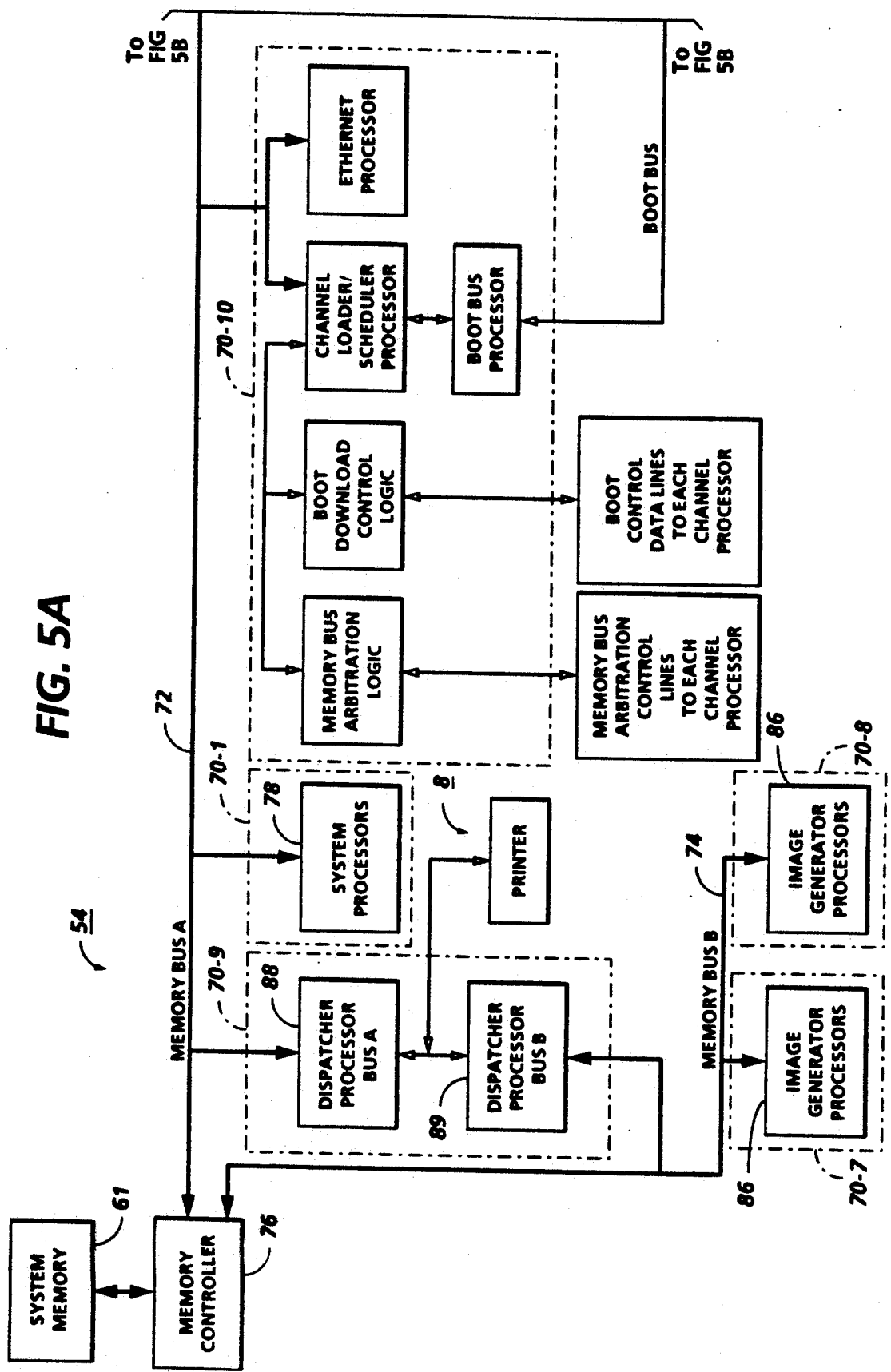
Figure 5B:
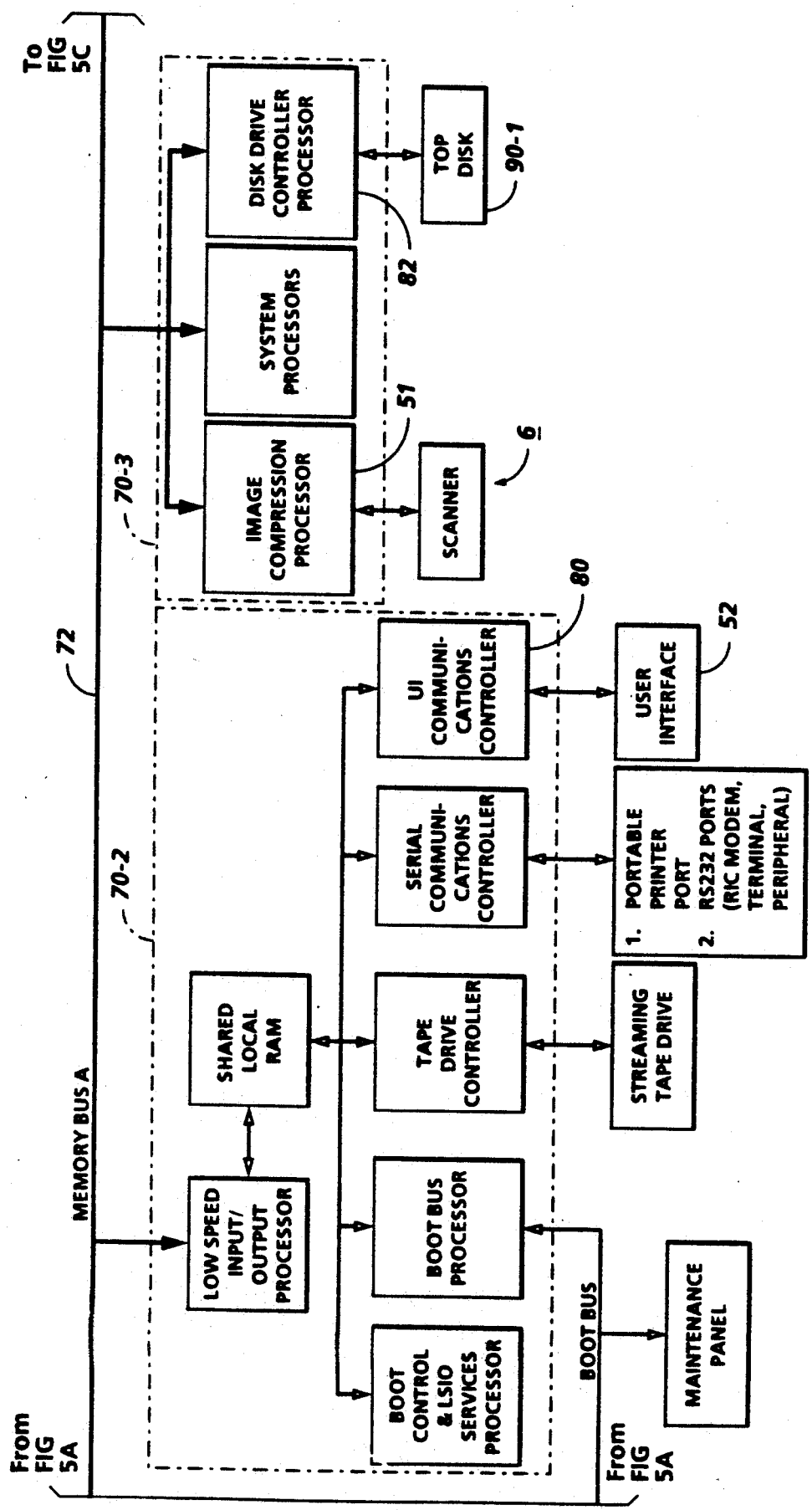
Figure 5C:
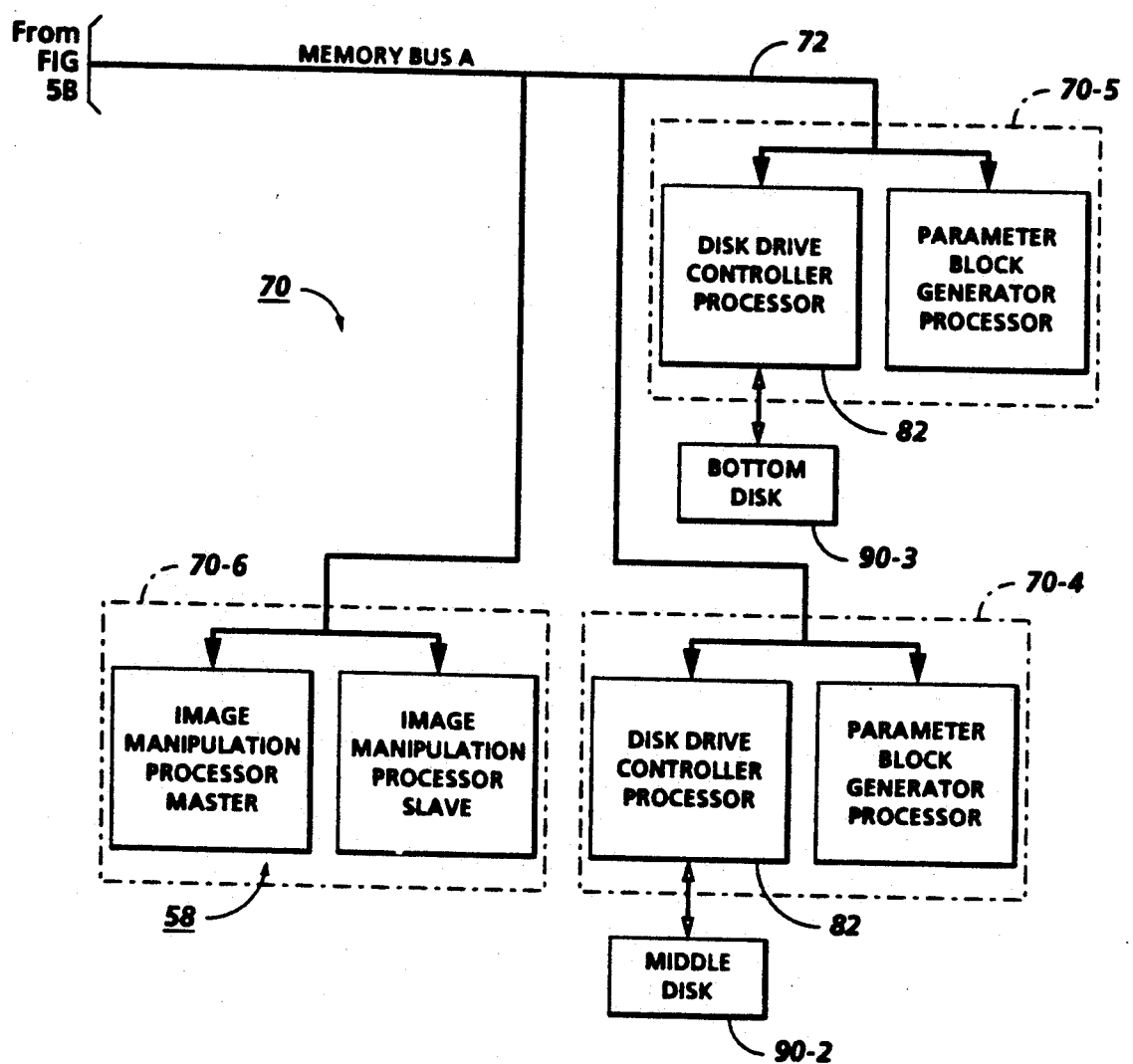
Figure 6:
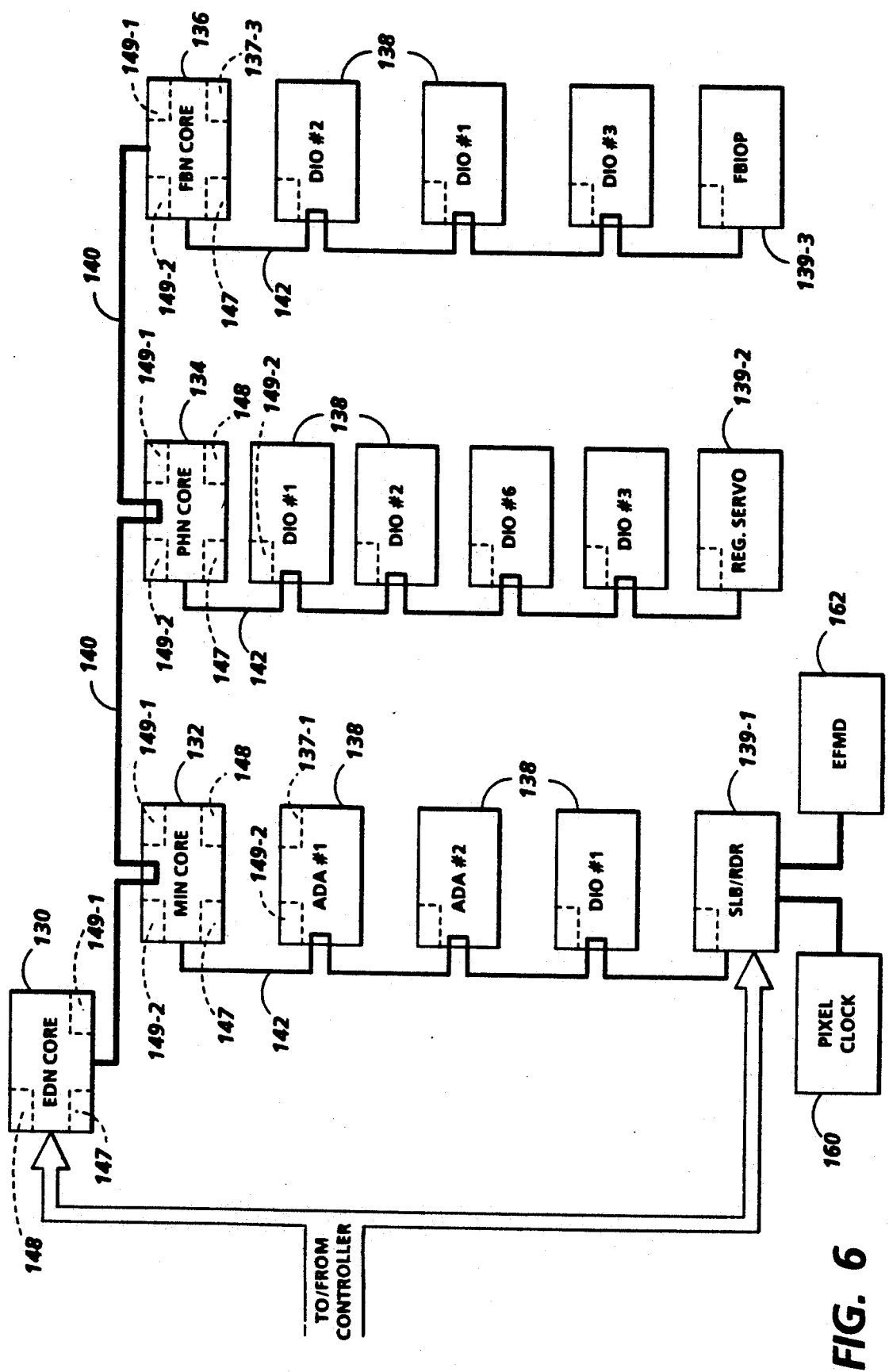
Figure 7:
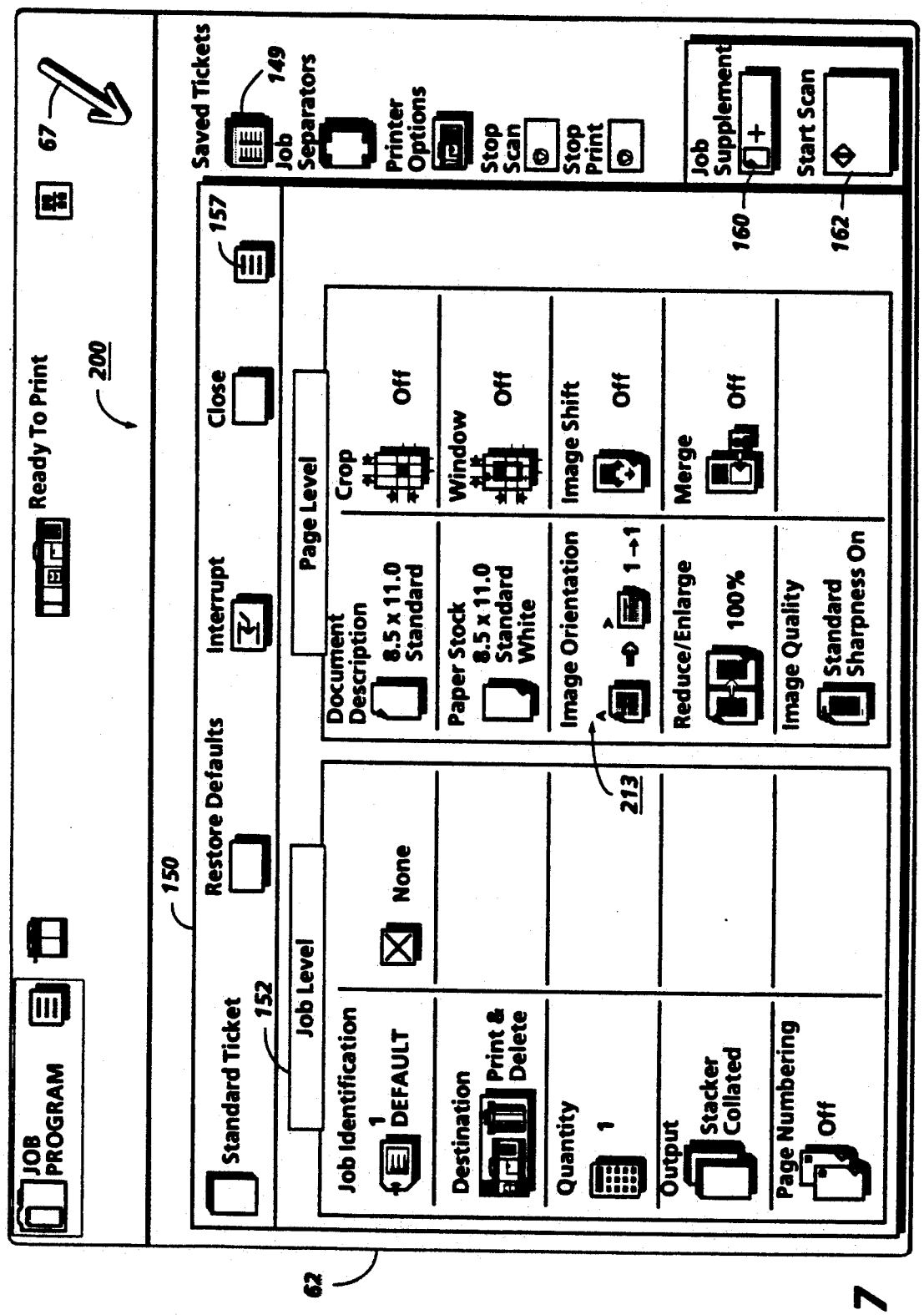
Figure 8A:
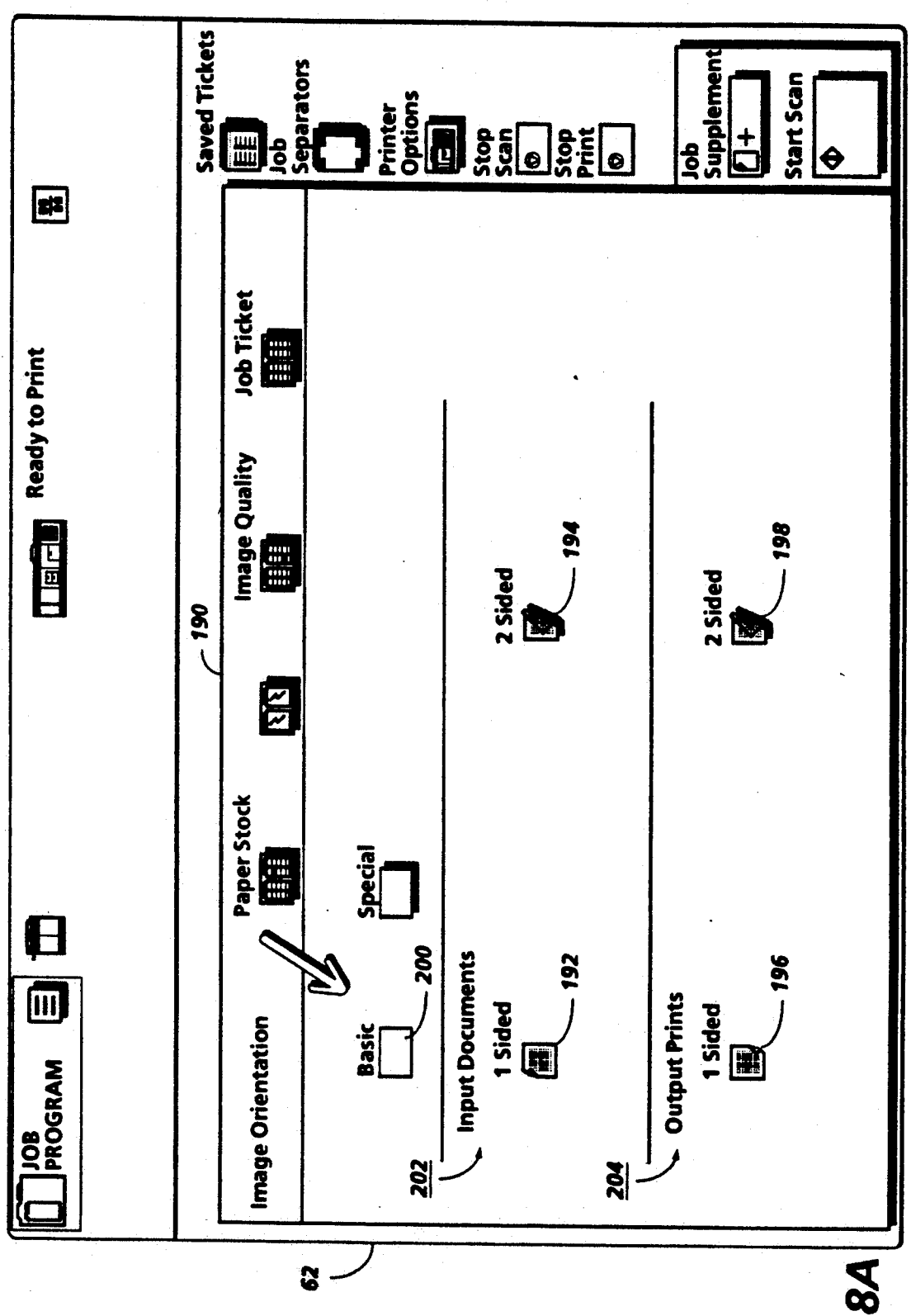
Figure 8B:
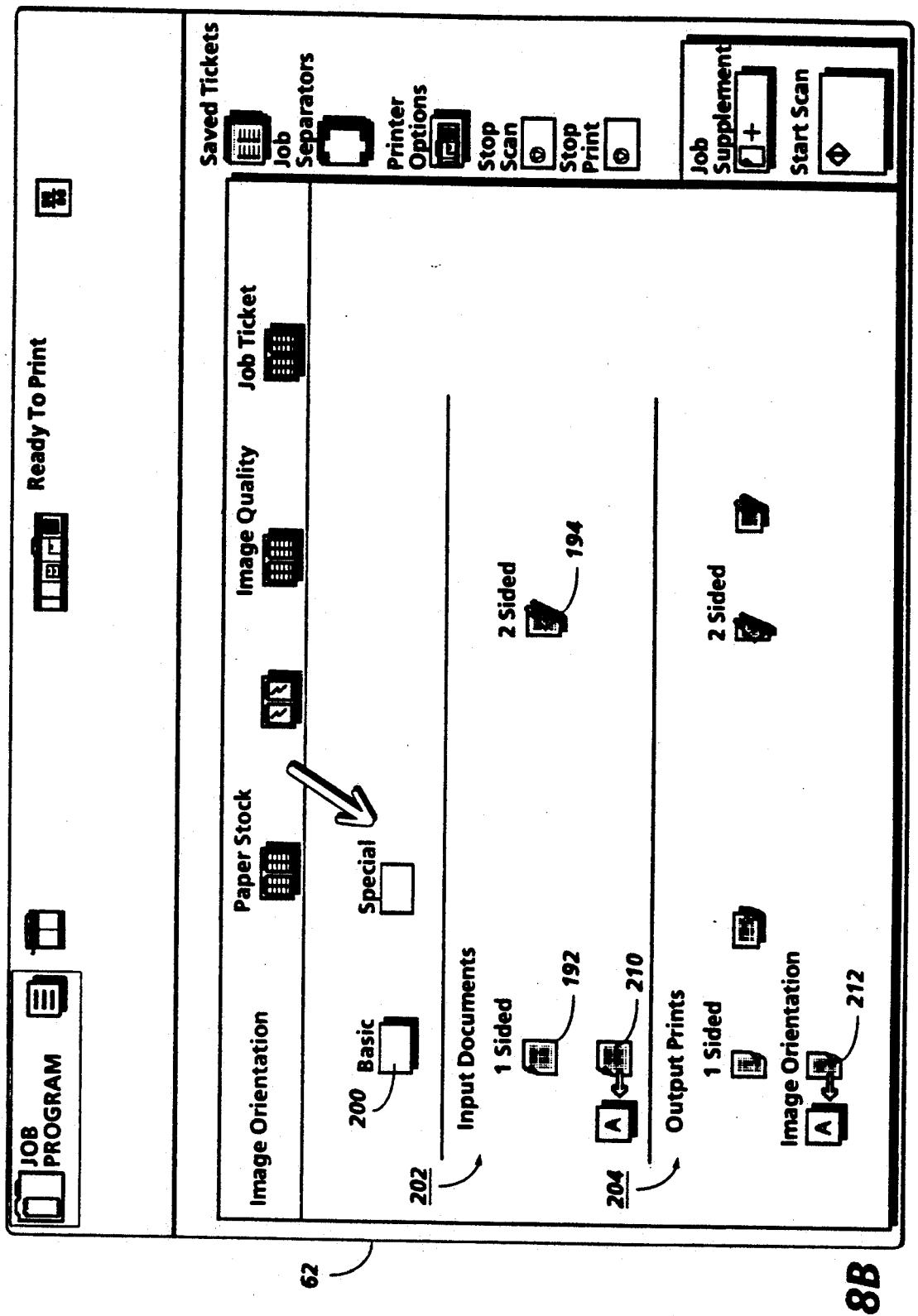
Figure 9:
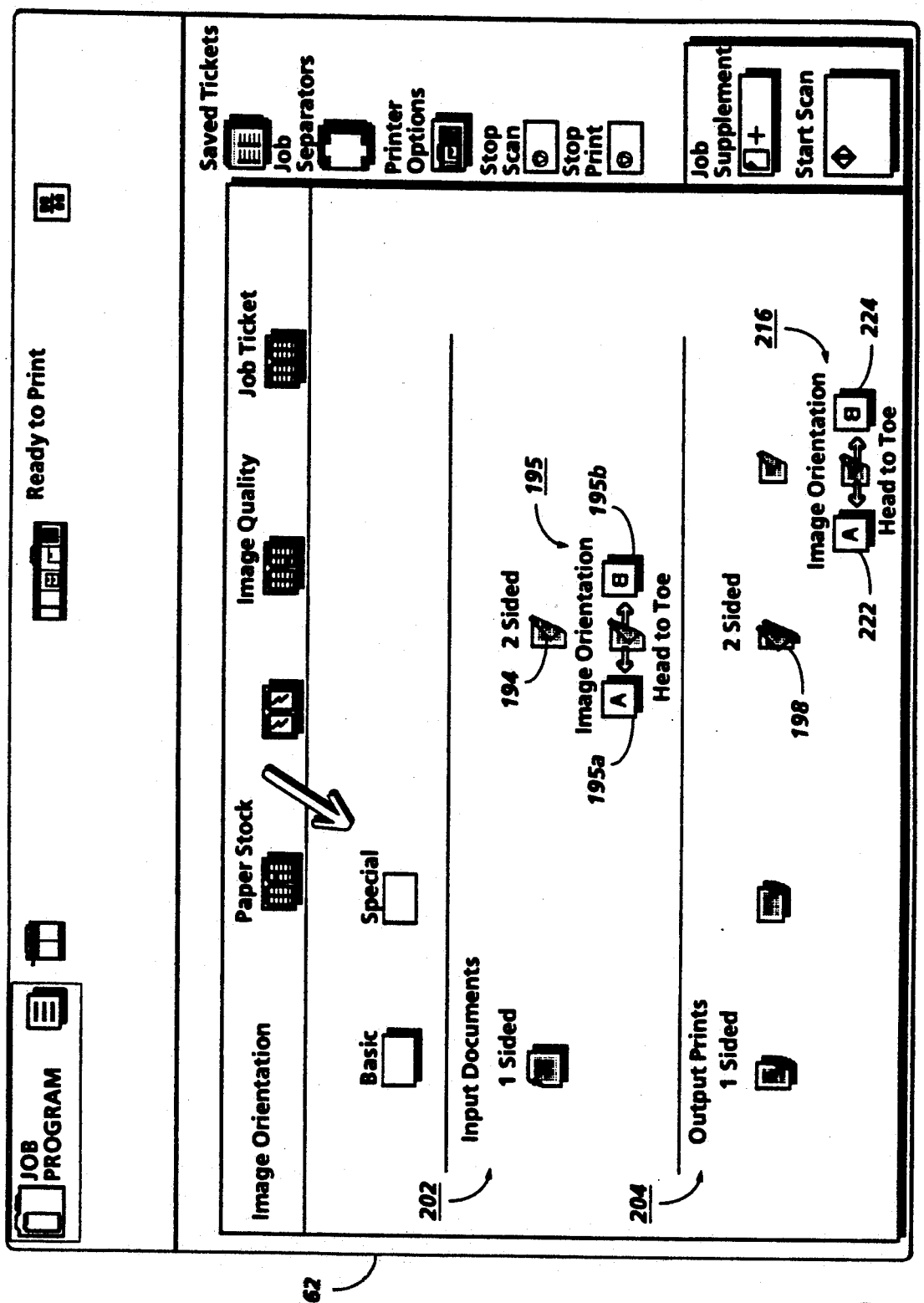
Figure 10:
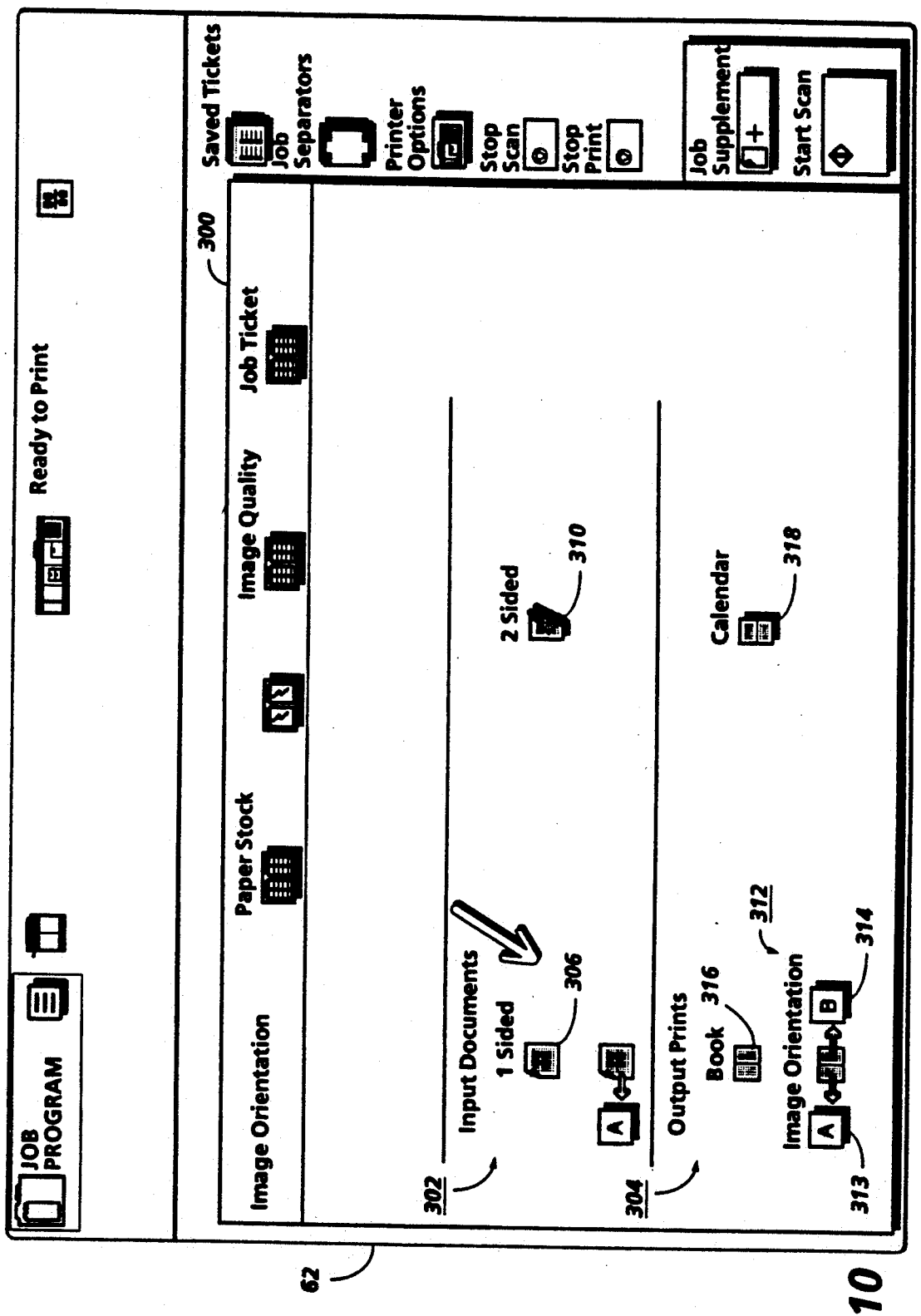

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8A is a view depicting standard plex selection;

FIG. 8B is a view depicting plex selection with orientation selection;

FIG. 9 is a view illustrating duplex output print selection with orientation selection;

FIG. 10 is a view depicting signature (book) output print selection with orientation selection; and FIG. 11 is a view showing how rotation must occur in standard sets of signatures.

Figure 2:
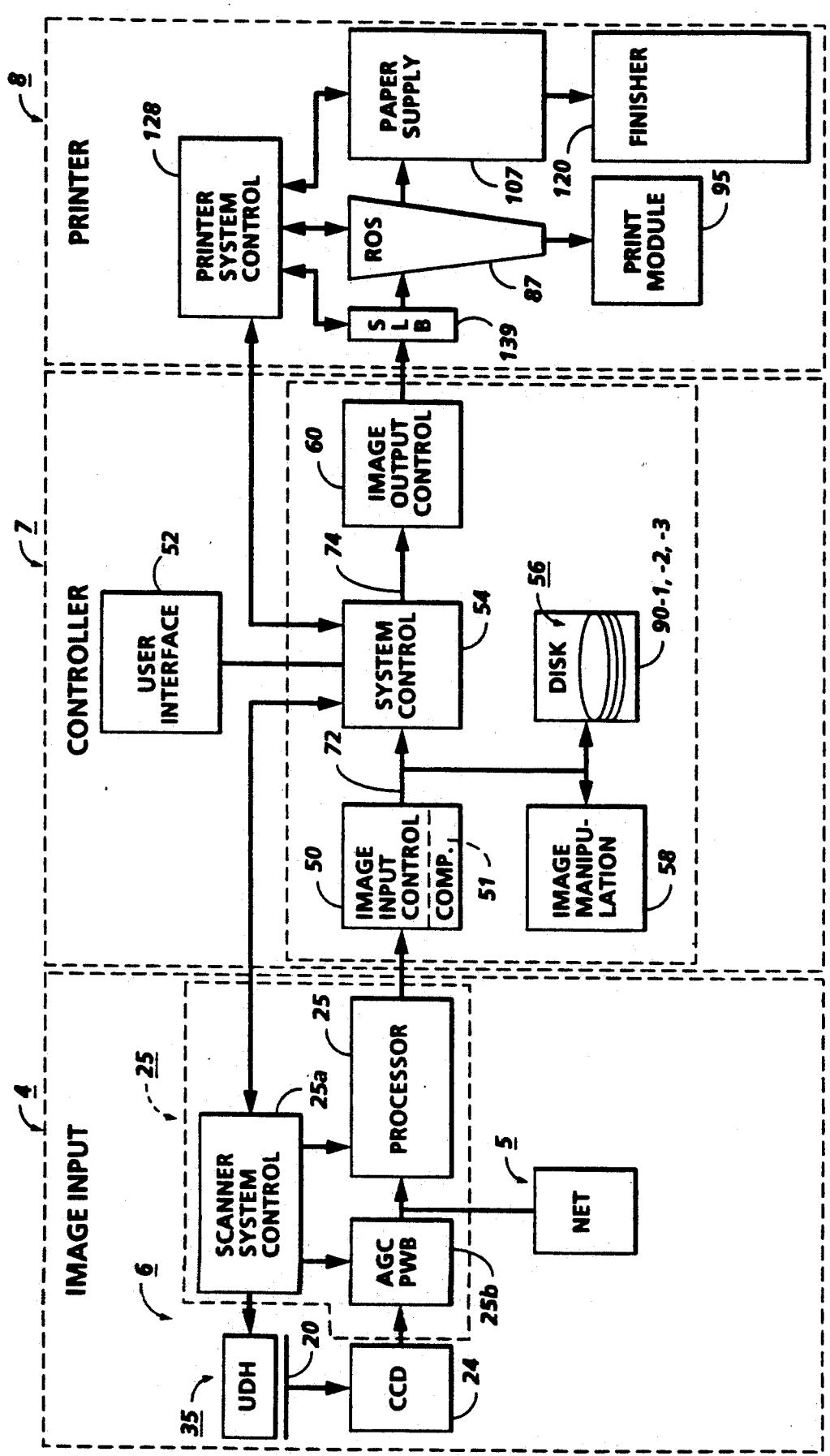
FIG. 2 is a block diagram depicting the major elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

Figure 3:
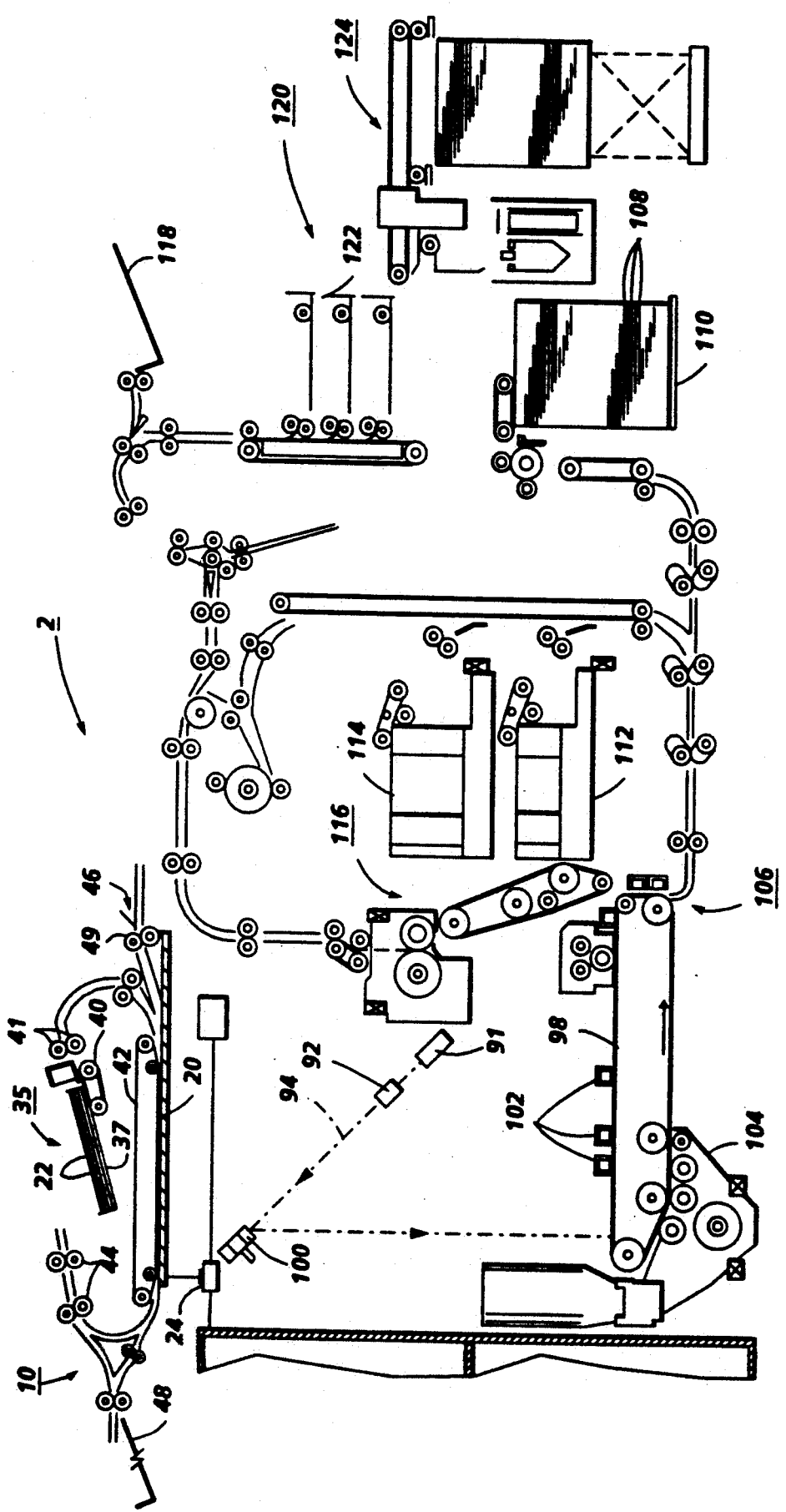
FIG. 3 is a frontal view illustrating the principal mechanical components of the printing system shown in FIG. 1.
Figure 4:
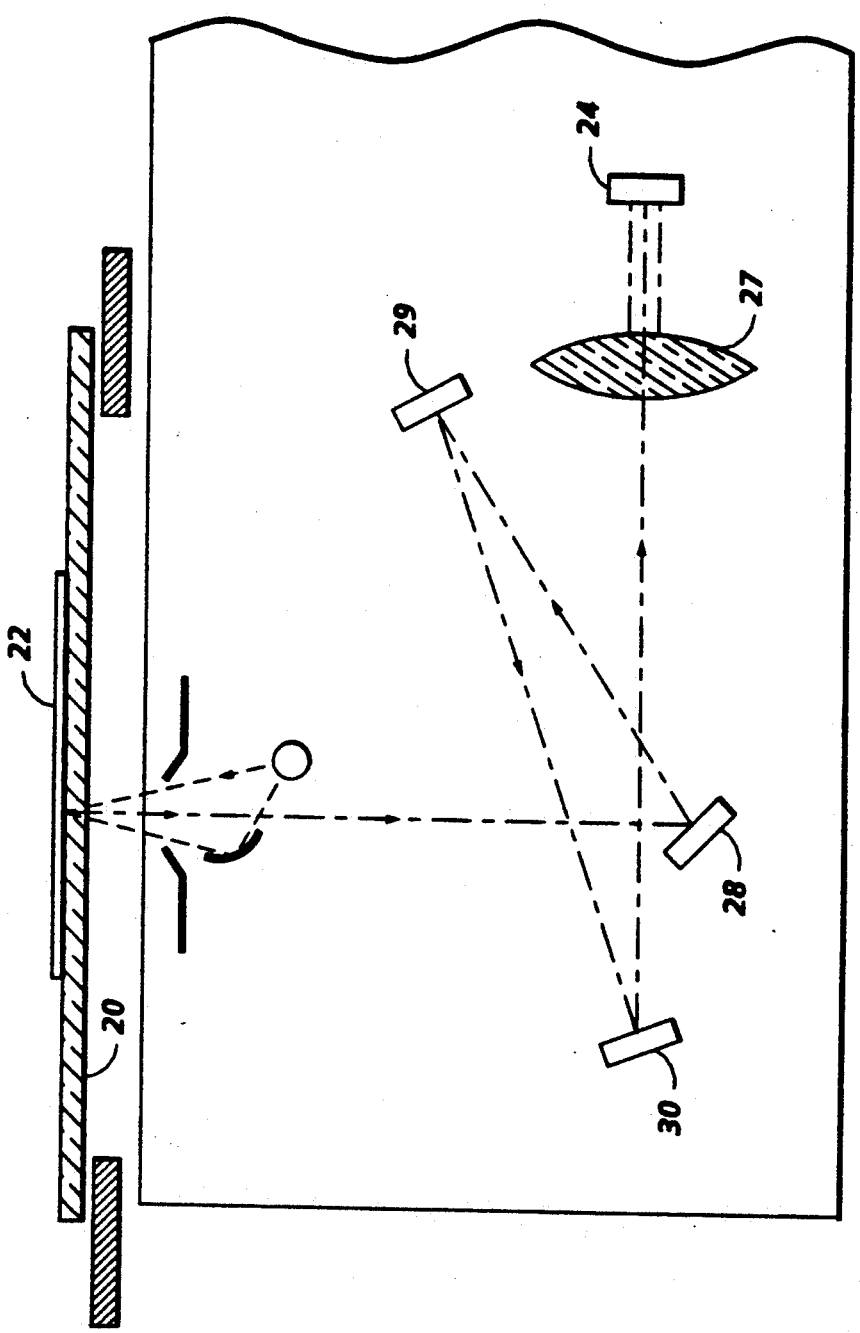
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line or Local Area Network (LAN) connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner section 6 with a Universal Document Handler (UDH) 35 for the purpose of automatically and sequentially placing and locating sets of multiple documents 22 for scanning on a transparent platen 20. One or more linear light sensitive arrays 24 are supported for reciprocating scanning movement below platen 20. Array 24, which may utilize Charge-Coupled Device (CCD) technology or the like, provides image elemental signals or pixels representative of the image scanned which are input to processor 25 for processing.

Scanning system processor 25 communicates with the system controller 54 (described below) and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image pixels derived from net 5 are similarly input to processor 25.

Processor 25 also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification within scan processor 25.

Documents 22 to be scanned may be located on platen 20 for scanning by Universal Document Handler (UDF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, UDH 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer, and for purposes of explanation, is separated into a Raster Output Scanner (ROS) section 87, Print Module Section 95, Paper Supply section 107, Finisher 120, and Printer System Control 128. ROS 95 has a laser 91, the beam of which is split into two imaging beams 94 (only one shown for description purposes). Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan, and create the latent electrostatic images represented by the image signal input to modulator 92.

Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books. Other finishing options such as slitting, perforating, saddle stitching, folding, trimming, or the like, either singly or in combination may also be accommodated in alternate finishing modules.

Referring to FIGS. 1, 2 and 5, controller section 7 is, for explanation purposes, divided into an image input controller 50, User Interface (UI) 52, system controller 54, main memory 56, image manipulation section 58, and image output controller 60. The units 50, 54, 56, 58, 60 comprise a system 55 which may also generally be referred to as the "Electronic Subsystem" (ESS).

The scanned image data input from processor 25 of scanner section 6 to controller section 7 is compressed by image compressor processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready (document editing), decomposition, rotation, etc are carried out. Following processing, the data may be returned to main memory 56, sent to UI 52 for display on touchscreen 62, or sent to image output controller 60.

Rotation is accomplished at image manipulation section 58 on PWB 70-6 in accordance with U.S. patent application Ser. Nos. 07/453,738 filed Dec. 20, 1989, and 07/721,797 filed Jun. 26, 1991, herein specifically incorporated by reference. Generally, an algorithm for rotating an image 90 degrees starts with an array of r rows and c columns of pixels. Each column of the pixel array is partitioned into words of w pixels each, and the rows, the columns, the words in each column, and the pixels in each word of the pixel array are all numbered starting at zero. Let $v = \lceil r/w \rceil$, where $\lceil r/w \rceil$ is the smallest integer greater than or equal to r/w. Similarly, let $h = \lceil c/w \rceil$. The algorithm stores words of the original pixel array into a linear word organized memory at image manipulation section 58 as follows: it circular right-shifts each word i of column j by (j)mod w pixel positions and then writes in parallel this modified word into word address vj+i of the memory. The algorithm fetches words of the stored pixel array from this memory rotating this pixel array 90 degrees as follows: it reads a whole word in parallel such that each pixel p of this word comes from pixel p of word address $wvi + v((p+j+1) \bmod w) + \lfloor (wv-j-1/w) \rfloor$ and then circular right-shifts this word by (j+1)mod w pixel positions, thereby delivering word i of column j of a 90 degree rotated version of the original pixel array. The process may be repeated for multiples of 90° rotations.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIGS. 2 and 6, within the printer section 8 there is an extensive printer system controller 128 to automatically and precisely control all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7, while local serial buses 142 serve to couple the I/O PWBs 138 with each other and with their associated core PWB.

The I/O PWBs may be classified into a generic standardized category 137, generally adapted to handle the normal and common signal I/O functions, or otherwise a category 139 of unique, custom I/O controller PWBs which are designed to handle specialized, complex I/O functions requiring dedicated high-performance processing of critical signals. The categories may be further characterized as: Analog-Digital/Digital-Analog (ADA) type 137-1, containing A/D and D/A conversion circuitry in order to handle and process multiple analog input signals and provide plural analog output voltages as needed; Digital Input/Output (DIO) type 137-2, which directly capture numerous digital (binary) input signals and drive a variety of digital output devices; special coprocessor 139-1-Scan Line Buffer/ROS Diagnostic Remote (SLB/RDR)-designed to process and manage the very high speed video image data retrieved from system controller (ESS) 55 and to control and synchronize the image data and the ROS subsystem 87 to the printer activity; special coprocessor 139-2-Registration Servo Controller (REG.SERVO)-adapted to drive precision servo-systems in order to provide critical motion and positioning drive systems within the paper handling subsystem 107; special coprocessor 139-3-Finisher/Binder I/O Processor (FBIOP)-which contains servo-system controllers and custom and standard I/O signal processing within the finisher/binder subsystem 120.

It should also be noted that the operation of SLB/RDR 139-1 is supported and augmented by two additional specialized PWBs in the control and processing of image data and the ROS 87. These are: a PIXEL CLOCK PWB 160, which contains very high speed signal generation and processing circuits including a phase-locked loop (PLL) circuit and other functions to generate a video data "PIXEL" clock for retrieving and presenting image data to ROS 87 in precise synchronism with the aerial scanning activity of the laser beams 94a and 94b impinging upon photoreceptor surface 98; and an Expanded Polygon Motor Driver (EPMD) PWB 162 which comprises the precision velocity servo control and drivers for the ROS scan-polygon motor as well as many ancillary control I/O circuits and functions related to operating the high performance dual-beam ROS 87.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types 148 are resident at various locations within system 2 to accommodate the plurality of operational tasks, algorithms, and activities which must occur concurrently in real time within printer system 8. Additionally, specialized intelligent serial communications controllers 149 which encompass integral ROM and RAM (memory), and universal asynchronous receive-transmit (UART) circuitry, together with communications operating software, handle the serial message handling and distribution over the serial communications busses. Controllers 149-1 are adapted for the shared-line bus 140, while controllers 149-2 process local bus 142 data.

Referring to FIG. 7, jobs are programmed in a Job Program mode in which there is displayed on touch-screen 62 a Job Ticket 150 and a Job Scorecard 152 for the job being programmed. Job Ticket 150 displays various job selections programmed while Job Scorecards 152 displays the basic instructions to the system for printing the job. Various Job Ticket types are provided, with access by means of Job Ticket Auxiliary Icon 157.

Job Tickets 150 have two programming levels, referred to as "Job Level", and "Page Level", each having a series of icons for accessing the various programming selections available at that level. Each programming level has a Scorecard 152 associated with it.

As described print jobs may be derived from multiple sources, i.e., jobs scanned in using scanner 6 for printing; jobs scanned in, stored, and then edited or added to for printing later; jobs remotely scanned in and submitted to the system as, for example, through net 5; jobs remotely developed and then submitted to the system for printing, etc.

In accordance with the invention, the effectiveness of simple rotation features present in the described apparatus is enhanced by requiring the operator to provide complete information about the input image orientation and a desired output orientation. In effect the operator is asked what is about to be directed into the system, and what should be obtained at the output. Rotation decisions are then made for the operator in accordance with a preselected group of possible options.

Initially, and with reference to FIG. 8A, a user interface screen for image orientation and plex selection 190 is presented at UI 62, divided into two sections 202, and 204, respectively labeled "Input Documents" and "Output Prints". An option selection 200 provides a choice of "Basic" or "Special", where the basic selection simply provides for one-sided input (simplex icon 192, two-sided input (duplex icon 194) one-sided output, (simplex icon 196) and two-sided output (duplex icon 198). The icons are designed in a manner which will not give the operator false information about the orientation of any documents, while making these selections. In the "Basic" set of options, no orientation selections are provided.

Briefly, plex selection requires that the input plex be identified as one or two sided by selection respectively of input document icons 192 or 194, and requires that output plex be identified by selection of output print documents 196 and 198. In the Basic mode of operation, plex selection does not provide orientation selection. Accordingly, output prints are at the same orientation as input documents.

With reference now to FIG. 8B, for an operator to make any orientation variations, the choice of "Special" (with the selected selection "Special" shown shaded) is selected at option selection 200. Now, within section 202 is an image orientation icon 210 for operator selection of the orientation of the image on the input document. Plex selection (in this case simplex) results in the display of a number of possible orientation selections, perhaps 0°, 90°, 180° and 270°. Image orientation icon 210 provides a degree of orientation indication associated with the image orientation representation, varied by repetitively selecting image orientation icon 210, which in the present embodiment, increments the displayed degree of rotation by 90° increments, until the operator is satisfied that the degree indicated best represents the image orientation. Similarly, at Output Print section 204, an output image orientation icon 212 is provided, indicating the orientation of the output print. In both icons 210 and 212, indication of rotation is made by rotating the letter represented on the icons. With input orientation known and desired output orientation selected, a preprogrammed routine determines the difference between the two orientations, and rotates the image appropriately, in accordance with the rotation method earlier described.

With reference now to FIG. 7, the selections made at the image orientation selection screen illustrated in FIGS. 8A, 8B and 9, are reflected back to the job ticket, shown for the selection of simplex copying with a 90° rotation, at section 213.

With reference now to FIG. 9, if duplex input print icon 194 and duplex output print icon 198 are selected, a duplex output print orientation icon 216 is produced in section 204, representing orientation of each side of the document with respect to the other and, upon repetitive selection, displaying possible orientations for each side. Image orientation icon 195 provides degree of orientation indications 195a and 195b (the "A" and "B" images, respectively) associated with the image orientation of each side of the input document, each of which is varied by repetitively selecting orientation indications 195a and 195b, which in the present embodiment, increments the displayed degree of rotation by 90°, until the operator is satisfied that the degree indicated best represents the image orientation of each side of the input image. For the head to toe orientation, the phrase "Head to Toe" appears, as this has been shown a preference by users. Image orientation icon 216 provides degree of orientation indications 222 and 224 (the "A" and "B" images, respectively) associated with the image orientation of each side of the output document, each of which is varied by repetitive selection, which in the present embodiment, increments the displayed degree of rotation by 90°, until the operator is satisfied that the degree indicated best represents the image orientation of each side of the output image. For the head to toe orientation, the phrase "Head to Toe" appears, as this has been shown a preference by users.

It will no doubt be appreciated that the above arrangement allows a large selection of plex/orientation combinations, that will not be further described. It is an advantage of the invention that with a relatively few choices for control, a large number of control choices may be made. Of course, less user friendly interfaces could be used within the scope of the invention.

In one embodiment of the invention described in FIG. 9, the arrangement described does not allow the final rotation of A and B images from input to output to be independent. The difference between input document A and output print A should be either the same as the difference between input document B and output print B, or 180° different. This is referred to as "being in phase". Thus, for example, if input document A is at 90° and output print A is 0°, and input document B is 270, then output print B must be either 0° or 180°, or else a conflict will be raised.

FIG. 10 shows the Image Orientation frame 300 for signature creation, accessed via auxiliary icon 157 in FIG. 7. As used in this description, signature printing refers to the capability to place image from separate documents onto a single side by side arrangement on a print or sheet. A "Book" is a signature, and as used herein, refers to a sheet containing plural, usually 4, printed page images, two on each side of the sheet, with a page arrangement such that when such sheets are center folded and nested inside of the other with other signature sheets in a set, they become a collated pamphlet or book, or a quire (quire refers to a collection of sheets) forming one section of a larger book. Generally, although not necessarily the pages of a book have a common top to bottom orientation, with the top of the image on each page adjacent to a common edge of the sheet. The Xerox Docutech Publishing System has the capability to take a set of original documents, and produce signatures ready for binding in the correct page order, even though the set of original documents is in 1-N order, not in the correct order for forming the signature. This capability is described in U.S. patent application Ser. No. 07/589,941, entitled "Electronic Printing System for Printing Signatures" by Rourke et al. and assigned to the same assignee as the present invention, which application is incorporated herein by reference for its teachings regarding the creation of signatures. A Calendar is a similar sheet or set of sheets, in which two page images are arranged on each side of a sheet having a co-aligned to bottom axes, with the bottom edge of one image arranged adjacent to the top edge of the second image.

For this aspect of the invention, the functionality of the input section 302 is generally identical to that for FIGS. 8A & B, and 9, and Image Orientation frame 300 provides icons for directing input image orientation into the system, two "plex selections", including 1-sided or simplex icon 306, 2-sided or duplex icon 310. Orientations of the actual document may be input as orientation information, as described above, or determined by the document handler device, in its sensing arrangement for determining document orientation. Orientation of the image on the document is entered at Input Image Orientation section 302.

Plex selection results in the display of a limited number of possible output orientation selections, as shown in the comparison of image output print orientation icon 312, which provides degree of orientation indications 314, 315 for each side of the output print sheet (Side "A" and side "B") associated with the image input orientation, each orientation variable by repetitively selecting degree of orientation indications 313, 312, which in the present embodiment, increments the displayed degree of rotation by 90°, until the operator is satisfied that the degree indicated best represents the image orientation. In output section 304, however, instead of plex selection as previously described, the operator is provided with the choice of either Book icon 316 or Calendar icon 318, selection of one or the other causing an appropriate image rotation icon to appear. In a preferred embodiment, the orientation selection of the Output Prints may be constrained to a limited number of selections such as 0°, 0°, 0°, 270°, 270°, 270°, or otherwise as preferred.

FIG. 11 is a chart showing a likely set of potential orientations for signatures such as Calendars and Books. Column 1 gives a set of example output print copy sheet sizes (with size given as process direction length × cross process direction length). Column 2 describes how those copy sheets travel through a reproduction device such as the Xerox Docutech Publishing System, with arrows 400(a)–(d) showing the direction of travel of the sheets in the process direction. Column 4 shows the orientation of images placed on the copy sheets (output prints) if the input images are oriented at 0°. Column 5, however, shows how the printed stock is usually used, which for example, for 17×11 calendar output prints, will be incorrect. Accordingly, Column 6 shows the required rotations. It will no doubt be appreciated that constraints may be placed on rotation based on this chart, and the combination of information about 1) sheet size; 2) signature format, and whether the sheet is long edge first or short edge first.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. In a printing apparatus having a scanner for deriving an electronic image of an input document, means for placing the input document at positions for selectably scanning each side thereof, means for processing electronic images of the input document in accordance with a predetermined image processing arrangement, a printer for producing output prints of processed images selectably printed on each of two sides thereof, means for directing processed images to the printer, and a controller for controlling the orientation of the image and plex of an output print comprising:

means for rotating each image by predetermined increments in response to a request from the controller;
   means for directing to the controller information about the original orientation of each image on the input document with respect to a reference, and plex of the input document;
   means for directing to the controller information about the desired output orientation of the images on the input document with respect to a reference and, plex of an output document; and
   said controller, receiving said original orientation and plex information and said desired output orientation information, and producing a request to said rotation means to rotate each image by the incremental amount between the two orientations.

2. The apparatus as defined in claim 1, where said means for directing to the controller information about the original orientation of the image with respect to a reference includes a user interface, with an input orientation selection feature.

3. The apparatus as defined in claim 2, where said input orientation selection feature provides for identification of input orientation of an image on each of two sides of an input document.

4. The apparatus as defined in claim 2, wherein said user interface provides a display presenting an input orientation mimic icon, selectable by a user to represent an input orientation selection.

5. The apparatus as defined in claim 4, wherein said input orientation mimic icon, selectable by the user to represent an input orientation selection, provides for identification of input orientation of an image on each of two sides of an input document.

6. The apparatus as defined in claim 1, where said means for directing to the controller information about the desired output orientation of the image with respect to a reference includes a user interface, with an output orientation selection feature.

7. The apparatus as defined in claim 6, where said output orientation selection feature provides for identification of desired output orientation of an image on each of two sides of an output document.

8. The apparatus as defined in claim 6, wherein said user interface provides a display presenting a desired output orientation mimic icon, selectable by a user to represent an output orientation selection.

9. The apparatus as defined in claim 8, wherein said desired output orientation mimic icon, selectable by the user to represent a desired output orientation selection, provides for identification of output orientation of an image on each of two sides of an output document.

* * * * *